US006661367B2

(12) United States Patent
Sugiyama et al.

(10) Patent No.: US 6,661,367 B2
(45) Date of Patent: Dec. 9, 2003

(54) NON-DESTRUCTIVE PROBING SYSTEM AND A METHOD THEREOF

(75) Inventors: Kentaro Sugiyama, Kanagawa-ken (JP); Atsushi Abe, Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/063,048

(22) Filed: Mar. 14, 2002

(65) Prior Publication Data
US 2002/0130805 A1 Sep. 19, 2002

(30) Foreign Application Priority Data
Mar. 19, 2001 (JP) .......................... 2001-077605

(51) Int. Cl.[7] .......................... G01S 13/88; G01S 13/00; G01V 3/12
(52) U.S. Cl. .............................. 342/22; 342/27; 342/89; 342/159; 342/195
(58) Field of Search ............................... 342/21, 22, 27, 342/28, 175, 192–197, 159, 89–103, 189, 190, 191

(56) References Cited
U.S. PATENT DOCUMENTS

| 5,457,394 A | * | 10/1995 | McEwan | 342/22 |
| 5,541,605 A | * | 7/1996 | Heger | 342/22 |
| 5,543,799 A | * | 8/1996 | Heger | 342/22 |
| 5,896,102 A | * | 4/1999 | Heger | 342/22 |

FOREIGN PATENT DOCUMENTS

| JP | 2000-258549 A | 9/2000 | G01V/3/12 |
| JP | 2001-4668 A | 1/2001 | G01R/13/20 |

* cited by examiner

Primary Examiner—Bernarr E. Gregory
(74) Attorney, Agent, or Firm—Derek S Jennings

(57) ABSTRACT

A signal processor includes a unit for forming designated groups from radar reflection signals, a memory unit for storing the designated groups of radar reflection signals individually, a first calculator for calculating a standard background signal SB from each of the designated groups of radar reflection signals stored individually. The signal processor further includes a second calculator for calculating differential signals between the individual radar reflection signals and the standard background signal SB separately for each of the designated groups and a unit for identifying the signal reflected from a search object out of the differential signal.

21 Claims, 18 Drawing Sheets

|  | Radar Reflection Signal | Standard Background Signal |
|---|---|---|
| G1 | a, b | SB=(a+b)/2 |
| G2 | c, d | SB=(c+d)/2 |
| G3 | e, f | SB=(e+f)/2 |
| G4 | g, h | SB=(g+h)/2 |

Fig. 10

NON-DESTRUCTIVE PROBING SYSTEM AND A METHOD THEREOF

BACKGROUND OF INVENTION

1. Field of the Invention

The present invention relates to non-destructive probing and more particularly to a non-destructive probing system for probing non-destructively and accurately for search objects buried in a matrix containing dielectric material, non-destructive probing method, program for conducting non-destructive probes, and computer-readable storage medium for storing the program.

2. Background Art

Radar probing which involves sending electromagnetic waves, especially high-frequency electromagnetic waves, into a matrix containing dielectric material and non-destructively inspecting or probing for search objects or cavities buried in the matrix finds applications in various fields because of its capability to probe for search objects non-destructively.

Normally, radar probing generates radar reflection signals by placing a transmit/receive antenna used as a probe adjacent to the surface of the matrix in which search objects are buried and detecting reflections from the search objects buried in the matrix.

However, radar reflection signals are affected by various noises including external noise and internally generated equipment noise. Consequently, when analyzing radar reflection signals to check for the presence of any search object, it is difficult to distinguish between noise and the search object. Various attempts have been made so far to solve this problem. For example, Published Unexamined Japanese Patent Application No. 2000-258549 discusses a method for improving probing accuracy by calculating differential signals through comparison of radar reflection signals with background signals. FIG. 1 summarizes a process of removing background signals.

According to the conventional process shown in FIG. 1, radar reflection signals are acquired in Step 101. Then in Step 102, background signals are calculated by averaging radar reflection signals including the reflected signals from search objects. In Step 103, the differential signals between the average background signal and all the radar reflection signals are calculated and in Step 104, radar reflection signals free of background influence is obtained.

Also, Published Unexamined Japanese Patent Application No. 2001-4668 discloses a waveform observation apparatus and method for calculating average waveform data from a plurality of measured waveforms and displaying measured waveform data and average waveform data.

The methods described above can undoubtedly improve the accuracy of probing for search objects by removing background effectively. In radar probing, however, the surface of a matrix may be extremely uneven, i.e., bumpy, or a matrix may be composed of soil mixed with substances such as sand, gravel, or ballast exposed to the surface. In that case, it is not possible to bring a probe in contact with the ground surface completely. Consequently, direct coupling signals and signals reflected from the matrix surface are picked up in addition to the signals reflected from the search object.

Even in such cases, the influence of the variations in the signals reflected from the matrix surface can be reduced if the matrix surface can be flattened. However, it is not always possible to flatten the matrix surface to be probed by radar.

For example, at the time of removing small antipersonnel mines, it is necessary to probe, with high sensitivity and high accuracy, for the locations of small antipersonnel mines buried in various fields while preserving the matrix surface such as soil. In such cases, the reflection from the matrix surface such as soil is also observed as radar reflection signals together with the signals reflected from the buried search objects, i.e., the small antipersonnel mines. It is nevertheless necessary to minimize the influence of the signals reflected from the matrix surface and detect the search objects buried in the matrix with very high sensitivity and high accuracy.

Besides, although it is possible to take measurement by increasing the distance between the matrix surface and probe so much as to eliminate the influence caused by irregularities on the matrix surface, this will reduce measurement accuracy. Also, it is not always easy to keep the distance constant.

SUMMARY OF INVENTION

Under these circumstances, there has been demand for a system, a method, a program for executing the method, and a computer-readable storage medium storing the program which make it possible to detect or probe for search objects by radiating electromagnetic waves into a matrix and receiving radar reflection while ensuring sufficiently high sensitivity and accuracy even if the practical distance between the matrix surface and probe varies and non-destructively preserving the condition of the matrix surface.

Specifically, a feature of the present invention provides a non-destructive probing system for non-destructively probing for a search object buried in a matrix containing dielectric material by radiating electromagnetic waves to the above described matrix, including: a probe which is disposed in opposing relation to a surface of the above described matrix, radiates electromagnetic waves to the above described matrix, and detects radar reflection signals formed by reflection of the above described electromagnetic waves, and signal processing means for calculating the signal reflected by the search object from the above described radar reflection signals, wherein the above described signal processing means comprises: a unit for forming designated groups from the above described radar reflection signals, a storage unit for storing the above described designated groups of radar reflection signals individually, a unit for calculating a standard background signal from each of the above described designated groups of radar reflection signals stored individually, a unit for calculating a differential signal between each of the above described radar reflection signals and the above described standard background signal separately for each of the above described designated groups, and a unit for identifying the signal reflected from the above described search object out of the above described differential signal.

Another feature of the present invention provides a method for non-destructively probing for a search object buried in a matrix containing dielectric material by disposing a probe with respect to the above described matrix and radiating electromagnetic waves from the above described probe to the above described matrix, comprising the steps of: disposing an antenna in opposing relation to a surface of the above described matrix; radiating electromagnetic waves from the above described probe to the above described matrix and detecting radar reflection signals; forming designated groups from the above described radar reflection signals; storing the above described radar reflection signals by dividing them into the above described designated groups; determining a standard background signal for each of the above described designated groups; calculating a differential signal between each of the above described radar reflection signals belonging to the above described selected group and the above described standard background signal; and extracting the signal reflected by the above described buried search object from the above described differential signal.

Still another feature of the present invention provides a program for executing a non-destructive probing method comprising a step of disposing a probe in opposing relation to a surface of a matrix which contains dielectric material, a step of radiating electromagnetic waves from the above described probe to the matrix and detecting radar reflection signals, and a step of processing radar reflection signals which contain reflection from a search object by using signal processing means, wherein the above described program makes the above described signal processing means execute the steps of: radiating electromagnetic waves from the above described probe to the matrix and detecting radar reflection signals; forming designated groups from the above described radar reflection signals; storing the above described radar reflection signals by dividing them into the above described designated groups; determining a standard background signal for each of the above described designated groups; calculating a differential signal between each of the above described radar reflection signals belonging to the above described selected group and the above described standard background signal; and extracting the signal reflected by the above described buried search object from the above described differential signal.

Yet still another feature of the present invention provides a computer-readable storage medium that records a program for executing a non-destructive probing method comprising a step of disposing a probe in opposing relation to a surface of a matrix which contains dielectric material, a step of radiating electromagnetic waves from the above described probe to the matrix and detecting radar reflection signals, and a step of processing radar reflection signals which contain reflection from a search object by using signal processing means, wherein the above described storage medium makes the above described signal processing means execute the steps of: radiating electromagnetic waves from the above described antenna to the matrix and detecting radar reflection signals; forming designated groups from the above described radar reflection signals; storing the above described radar reflection signals by dividing them into the above described designated groups; determining a standard background signal for each of the above described designated groups; calculating a differential signal between each of the above described radar reflection signals belonging to the above described selected group and the above described standard background signal; and extracting the signal reflected by the above described buried search object from the above described differential signal.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF DRAWINGS

FIG. 10 is a diagram showing a data structure contained in the non-destructive probing system according to the present invention, and containing radar reflection signals classified into peak intensity groups and corresponding standard background signals SB.

DETAILED DESCRIPTION

Figure 1:
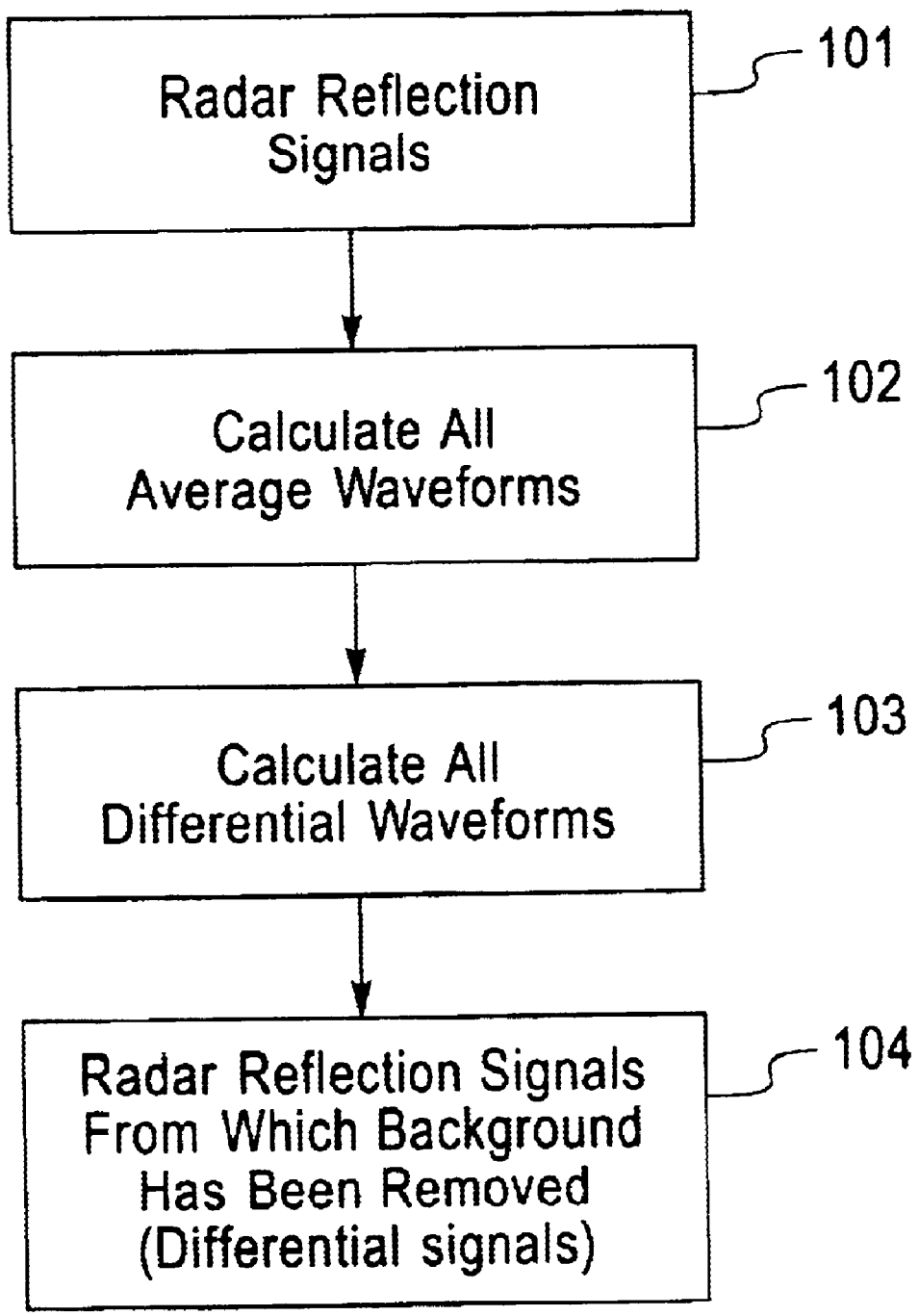
FIG. 1 summarizes a conventional process of removing background signals.

The present invention has been achieved in view of the above problems. It solves them by providing a non-destructive probing system, a non-destructive probing method, a program for conducting non-destructive probes, and a computer-readable storage medium storing the program. The present invention has been completed based on the finding that the intensity of radar reflection from the surface of a matrix is highly correlated with the distance between the probe and matrix surface. Specifically, the present invention divides radar reflection signals into groups according to the practical distance, calculates a standard background signal for each radar reflection signal group, and calculates differential signals between the individual radar reflection signals and the standard background signal of the given group. Thus, by making distinctions between signals that differ greatly from each other in the probe-to-matrix-surface distance, the present invention can improve the accuracy and sensitivity of probing.

According to the present invention, the designated groups of radar reflection signals are formed in accordance with the distance between the above described probe and the above described matrix surface. Also, according to the present invention, the designated groups of radar reflection signals are formed using peak intensities of the above described radar reflection signals.

According to the present invention, the above described standard background signal is generated as the average, median, maximum value, or minimum value of the standard background signals classified into the same group among the above described designated groups. According to the present invention, the above described matrix is soil. According to the present invention, the above described electromagnetic waves have a frequency of 10 GHz or less.

The present invention comprises a step of forming the designated groups of radar reflection signals in accordance with the distance between the above described probe and the above described matrix surface. The present invention comprises a step of forming the designated groups of radar reflection signals using peak intensities of the above described radar reflection signals. Also, the present invention comprises a step of calculating the above described standard background signal as the average, median, maximum value, or minimum value (whichever is selected) of the radar reflection signals classified into the same group among the above described groups. According to the present invention, the above described matrix is soil. Also, according to the present invention, the above described electromagnetic waves have a frequency of 10 GHz or less.

The present invention comprises a step of forming the designated groups of the above described radar reflection signals in accordance with the distance between the above described probe and the above described matrix surface. Also, the present invention comprises a step of forming the designated groups of the above described radar reflection signals using peak intensities of the above described radar reflection signals. The present invention comprises a step of calculating the above described standard background signal as the average, median, maximum value, or minimum value (whichever is selected) of the radar reflection signals classified into the same group among the above described groups. According to the present invention, the above described electromagnetic waves have a frequency of 10 GHz or less.

The present invention causes the execution of a step of forming the designated groups of radar reflection signals in accordance with the distance between the above described probe and the above described matrix surface using peak intensities of the above described radar reflection signals. The present invention causes the execution of a step of calculating the above described standard background signal as the average, median, maximum value, or minimum value (whichever is selected) of the radar reflection signals classified into the same group among the above described groups.

Figure 2:
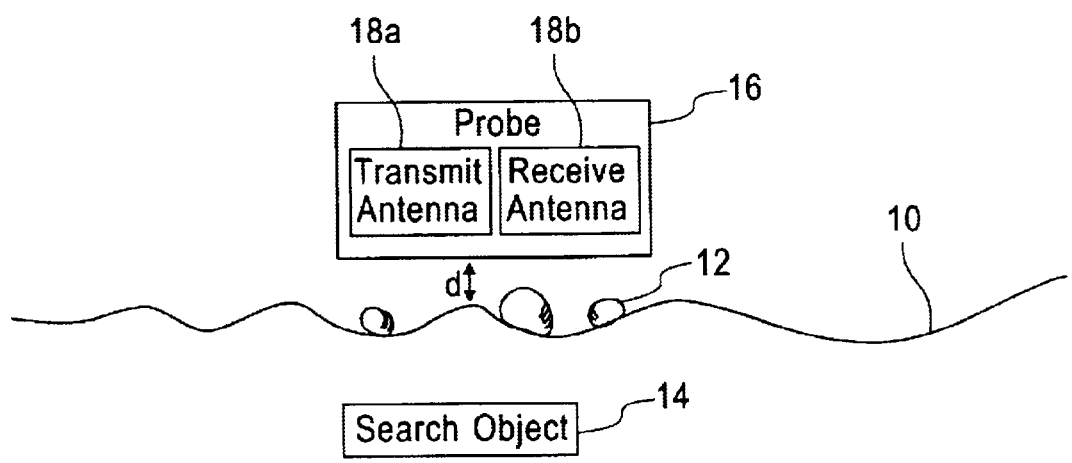
FIG. 2 is a diagram showing an embodiment in which a non-destructive probing system of the present invention is applied to bumpy soil with objects such as stones existing on its surface.

The present invention will be described below with reference to the embodiments shown in the accompanying drawings. However, the present invention is not limited by the embodiments described below. FIG. 2 shows an embodiment of the present invention which non-destructively probes for search objects buried in bumpy soil with objects such as stones existing on its surface. According to the embodiment shown in FIG. 2, the ground surface 10 is roughened by objects such as stone 12 in addition to the bumpiness of the soil itself.

A search object 14, specifically a small antipersonnel mine according to the embodiment shown in FIG. 2, is buried in the soil. Before removing the search object 14, its location should be probed with high accuracy and sensitivity. According to the embodiment shown in FIG. 2, a probe 16 is disposed in opposing relation to the ground surface 10. As shown in FIG. 2, however, the ground surface 10 is not flat. Consequently, practical distance d can be determined only as an average. Besides, the surface of soil may not always be distinctive.

The probe 16 shown in FIG. 2 has a transmit antenna 18a and receive antenna 18b installed internally as units separate from each other. However, it is unnecessary to separate a transmit antenna and receive antenna, and an integral-type transmit/receive antenna may be installed in the probe 16. Also, unlike the case in FIG. 2, it is unnecessary to install a transmit antenna 18a and receive antenna 18b in the same probe 16. They may be installed separately in different probes.

Figure 3:
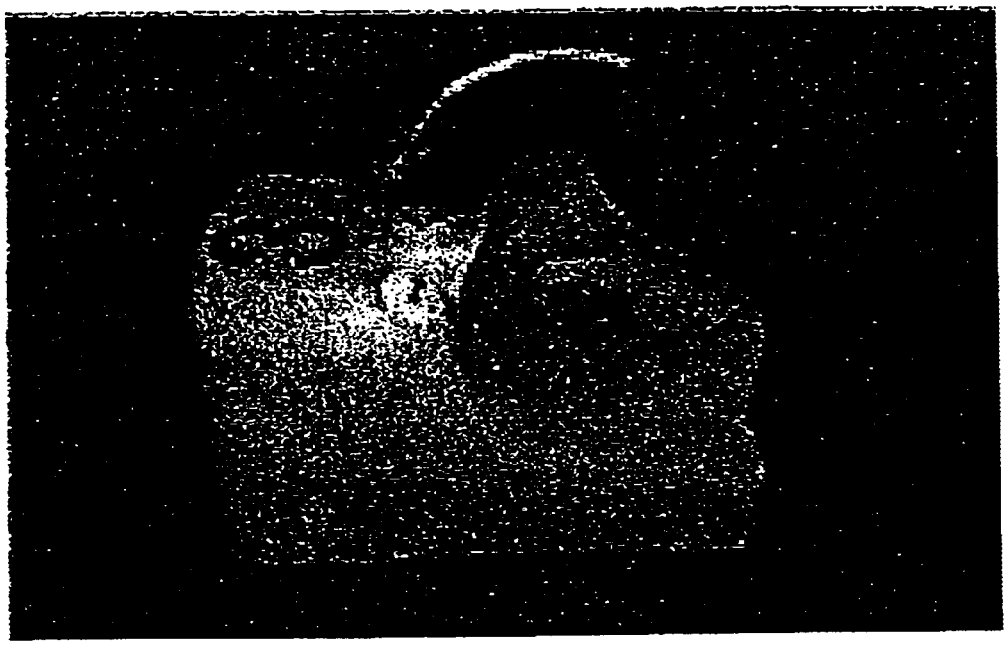
FIG. 3 shows an example of the probe which can be used in the present invention.

FIG. 3 shows an example of the probe 16 which can be used in the present invention. To radiate electromagnetic waves, the probe 16 available for the present invention has a transmit antenna 18a and receive antenna 18b installed internally as described with reference to FIG. 2. The present invention can use electromagnetic waves of any frequency depending on the characteristics of the matrix to be probed. Preferably, the frequency is 10 GHz or less, and more particularly, a frequency of approximately 2 GHz should be used if the probing depth is approximately 10 cm and the search object is 10 cm or less, which is the case with the embodiment of the present invention. However, electromagnetic waves with a frequency lower than 2 GHz may be used if the probing depth and search object is larger. According to the embodiment shown in FIG. 3, the probe 16 is designed such that the transmit antenna 18a radiates electromagnetic waves into soil and that the receive antenna 18b receives a reflected signal from the ground surface 10 and reflected signal from the search object 14. The receive antenna 18b also receives a direct coupling signal from the transmit antenna 18a and thus the three types of signal described above enter the receive antenna 18b, being superimposed on one another.

Figure 4:
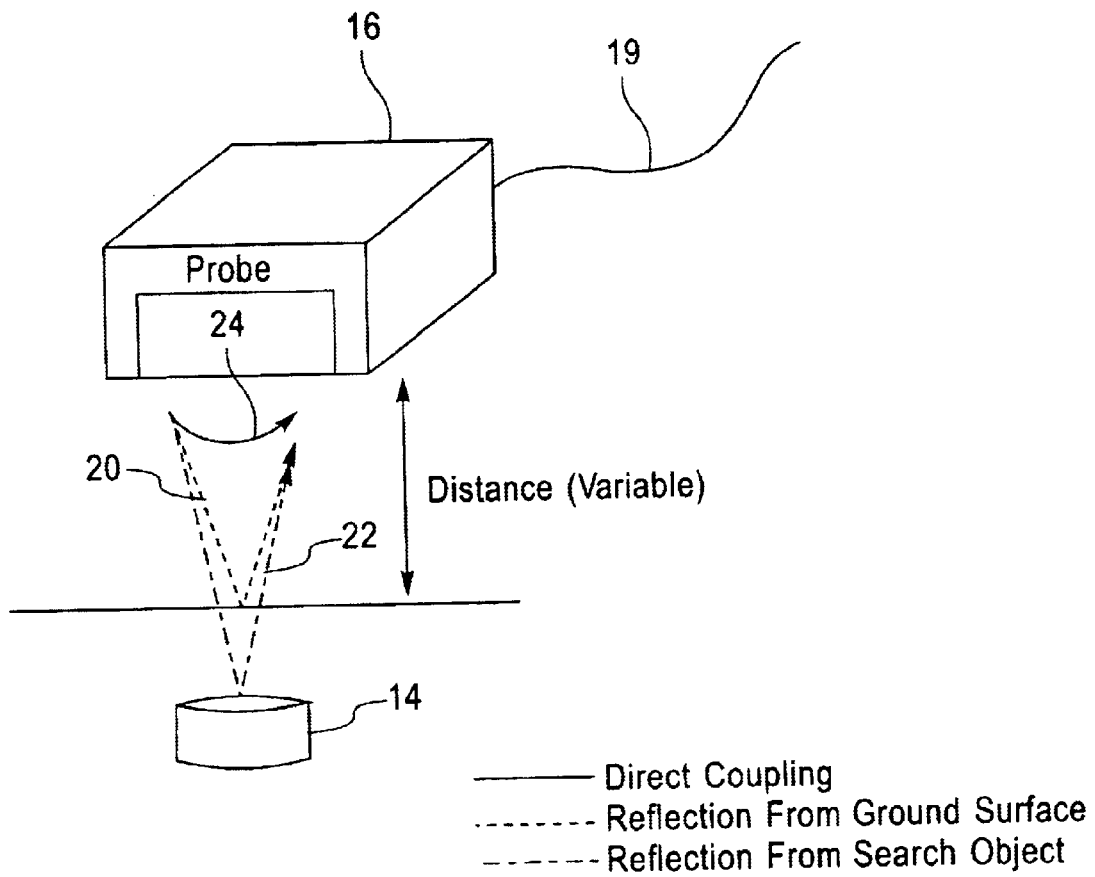
FIG. 4 is a schematic diagram showing generation and detection of a direct coupling signal, reflected signal from a ground surface, and reflected signal from a search object.

FIG. 4 is a schematic diagram showing generation and detection of the direct coupling signal, reflected signal from the ground surface 10, and reflected signal from the search object 14, described above. Electromagnetic waves radiated from the probe 16 (ground-penetrating radar) into soil is reflected by the ground surface 10 to form the reflected signal 20 from the ground surface 10, which signal 20 is then detected by the probe 16 as the reflected signal from the ground surface.

Of the electromagnetic waves radiated into soil, the part that is not reflected by the ground surface 10 travels further and is reflected by the search object 14, and the reflected signal 22 from the search object 14 is detected by the probe 16. Besides, the component transmitted from the transmit antenna 18a to the receive antenna 18b via a direct coupling forms a direct coupling signal 24, which also enters the probe 16. Thus, according to the present invention three types of signal described above compose a radar reflection signal.

Also, as shown in FIG. 4, the probe 16 sends the detected radar reflection signals to a signal processing system (not shown) through an appropriate bus line 19.

Figure 5:
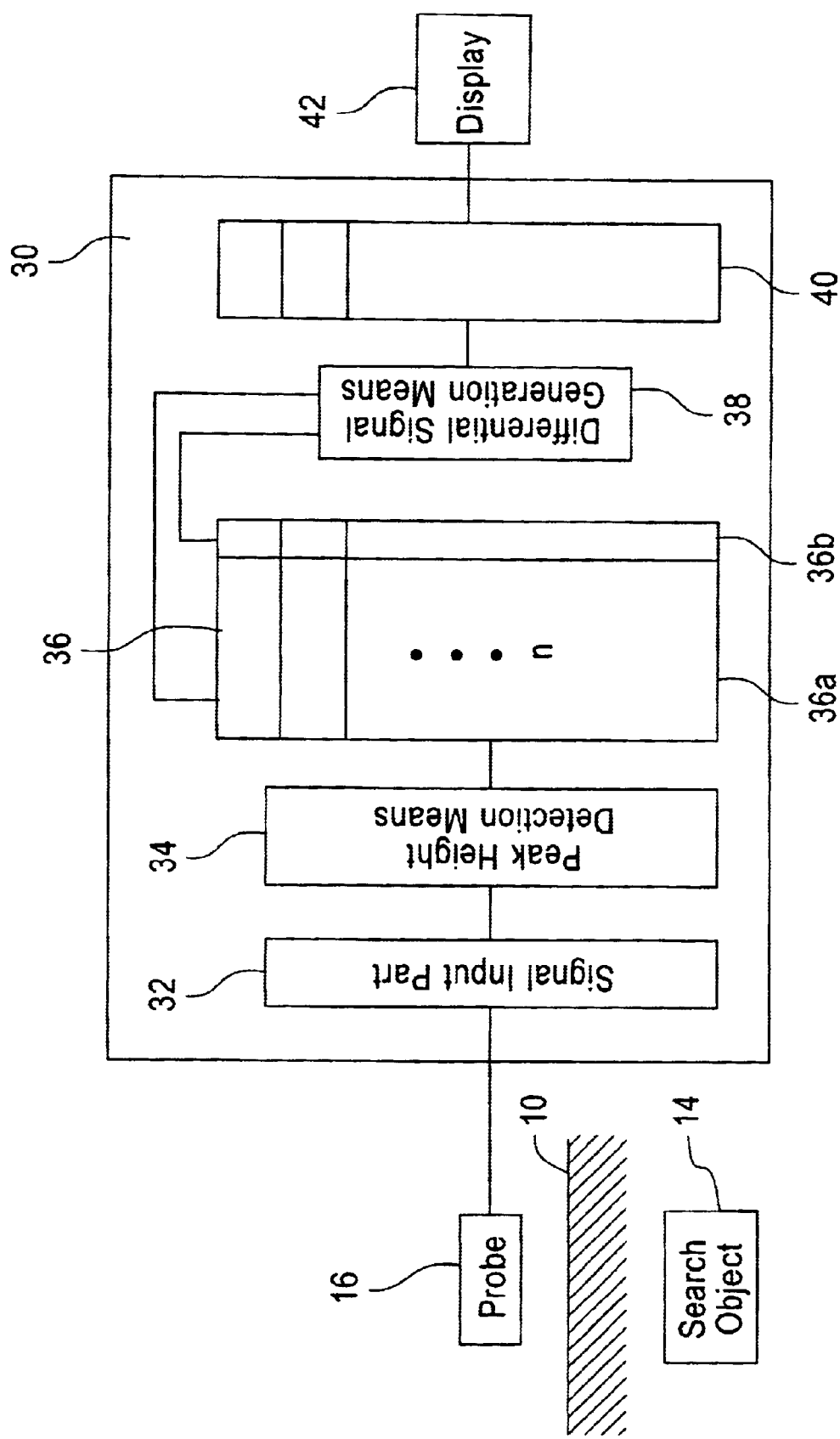
FIG. 5 is a diagram showing the non-destructive probing system containing signal processing means that can be used in the present invention.

FIG. 5 is a schematic diagram showing a non-destructive probing system containing signal processing means that can be used for the present invention. The radar reflection signals detected by the probe 16 disposed in opposing relation to the ground surface 10 is entered in signal processing means 30 via the bus line 19. As shown in FIG. 5, the signal processing means 30 comprises a signal input part 32, peak height detection means 34, storage means 36, and differential signal generation means 38.

The signal input part 32 receives the radar reflection signals sent from the probe via the bus line 19 and stores them in a buffer memory (not shown) in a data format processable by the signal processing means 30. The radar reflection signals stored in the storage means, i.e., the buffer memory, is retained until it is called in order to be processed by the peak height detection means 34. The peak height detection means 34 detects the peak intensities of the radar reflection signals which vary with the practical distance d between the ground surface 10 and probe 16, and determines the maximum and minimum values of the detected peak intensities of the radar reflection signals. Then the peak height detection means 34 divides the interval between the maximum and minimum values into n divisions (where n is a natural number equal to or larger than 1) to form designated groups corresponding to the peak intensities.

The storage means 36 stores the radar reflection signals classified into the groups formed according to the peak intensities. Also, according to the embodiment shown in FIG. 5, the signal processing means 30 calculates a standard background signal for each of the designated groups stored individually, for example, by averaging the radar reflection signals group by group. As shown in FIG. 5, the storage means 36 has storage areas 36a for storing the groups of radar reflection signals individually and areas 36b for storing the standard background signals.

The differential signal generation means 38 shown in FIG. 5 calculates differential signals between the radar reflection signals and standard background signals and outputs the results, for example, to a memory 40. The results stored in the memory 40 are so configured that they can be output later to display means 42. In the present invention, any known configurations other than those shown in the drawing may be employed for the storage means 36 and memory 40 described above.

According to the embodiment, shown in FIG. 5, of the non-destructive probing system of the present invention, the outputs from the differential signal generation means 38 are sent via the memory 40 to the display means 42 where they are displayed as numeric data and image data of the detected search object 14.

The above-mentioned signal processing means 30 of the present invention may be implemented, for example, as computing means such as, but not limited to, a personal computer or workstation which can contain a Pentium (trademark: Intel Corp.) or compatible CPU or PowerPC (trademark: International Business Machines Corporation) and run an operating system such as Windows (trademark: Microsoft Corp.), Windows NT (trademark: Microsoft Corp.), OS/2 (trademark: International Business Machines Corporation), Mac OS (trademark: Apple Computer Inc.), AIX (trademark: International Business Machines Corporation), Unix, or Linux.

Figure 6:
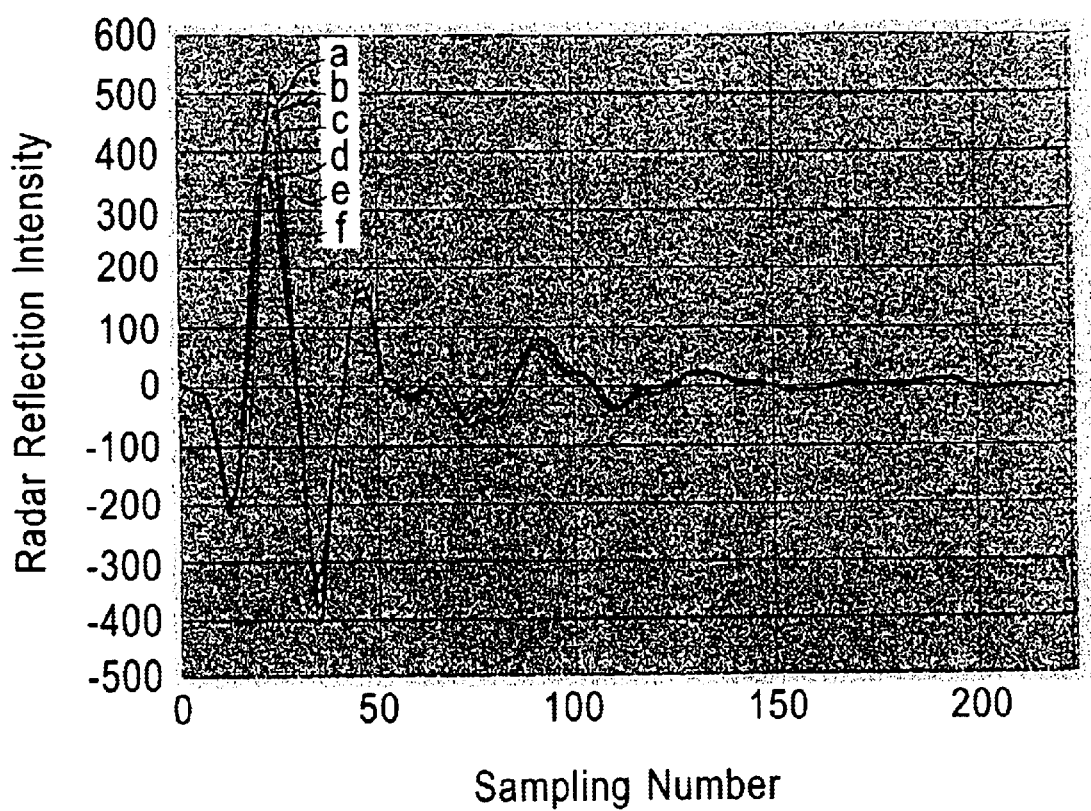
FIG. 6 is a diagram showing radar reflection signals measured by the non-destructive probing system of the present invention in FIG. 5.

FIG. 6 shows radar reflection signals measured by the non-destructive probing system of the present invention shown in FIG. 5. The vertical axis represents the relative intensity of signals (radar reflection intensity) while the horizontal axis represents sampling time as the channel number of the measuring apparatus used for time-resolved measurement. In FIG. 6, the distance between the probe 16 and ground surface 10 is varied between 0 and 50, and reflected waveforms corresponding to different distances are presented as 0 mm (a), 10 mm (b), 20 mm (c), 30 mm (d), 40 mm (e), and 50 mm (f).

As shown in FIG. 6, the reflected waveform for almost any distance has more than one positive peak value between sampling numbers 0 and 40. It can be seen that reflected waveforms including the positive and negative peak values which correspond to the reflections from a search object, i.e., an object buried in soil are acquired on channel 40 and subsequent channels.

Figure 7:
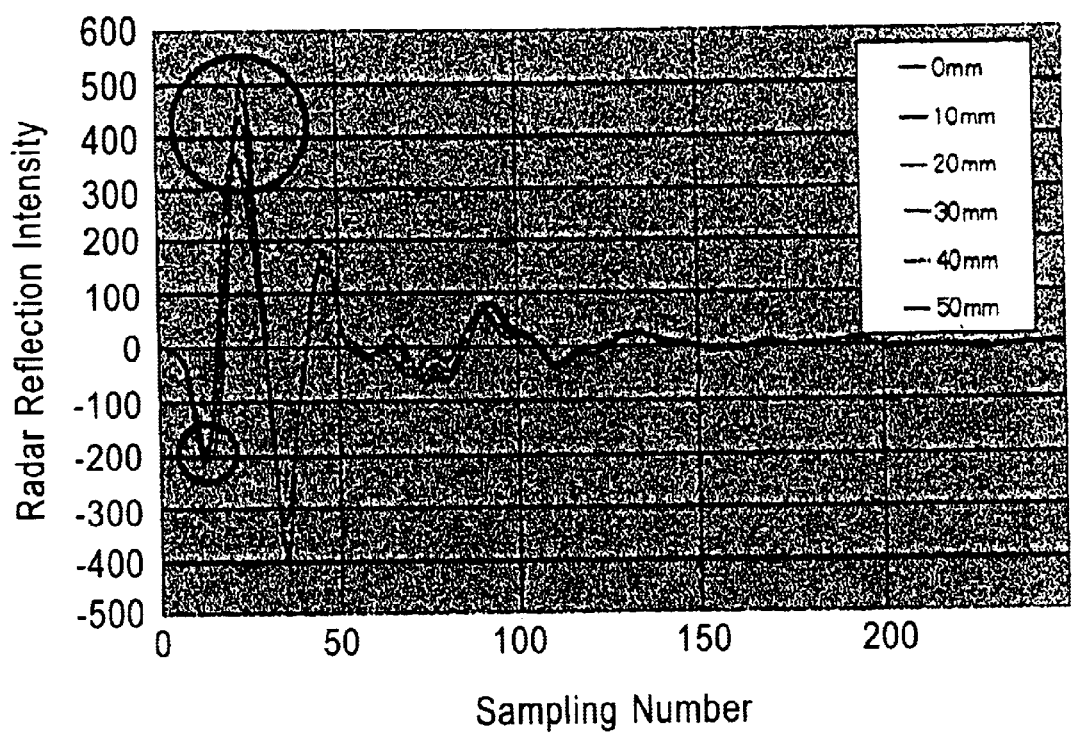
FIG. 7 is a diagram showing radar reflection signals measured under various distances d between the ground surface 10 and probe 16.

Of the reflected signals detected, the components reflected by the ground surface 10, which has shorter reflection paths and higher reflection intensities than the search object 14 buried in soil, are expected to give stronger reflected signals at an earlier time. Looking at FIG. 6 from this point of view, it can be said that the earlier part with small sampling numbers represents the positive and negative peak values which mainly include the reflected signals from the ground surface 10. FIG. 7 shows an embodiment of peaks of radar reflection signals which can be used in the present invention. The inventors took notice of the peaks circled in FIG. 7 and studied the correlation between the values of the positive and negative peaks and the distance from the ground surface 10 to the probe 16.

Figure 8:
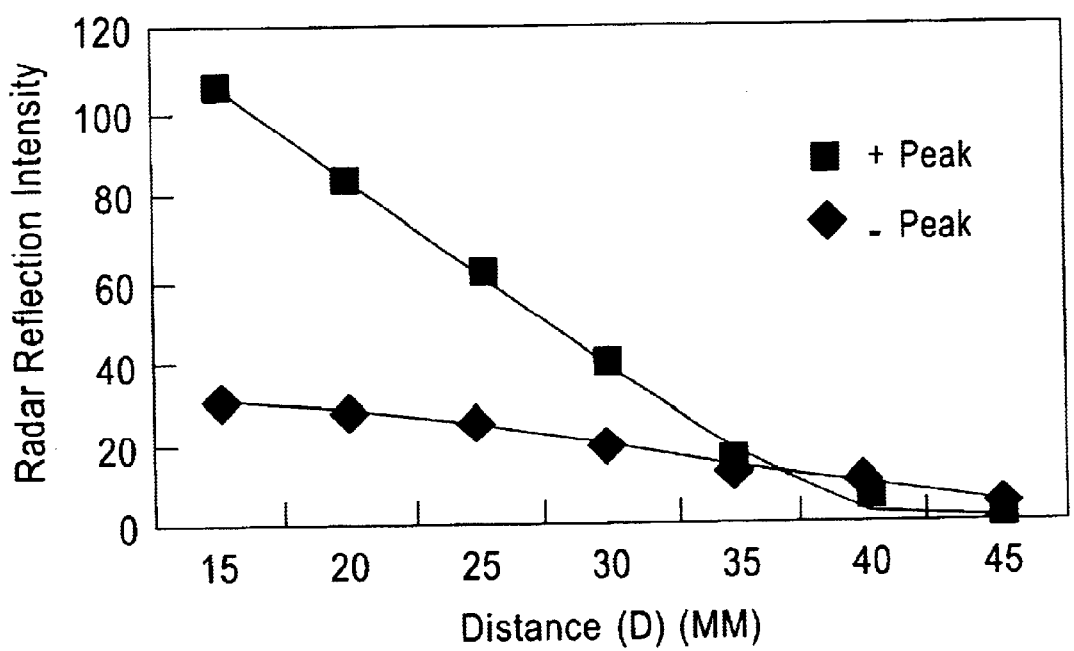
FIG. 8 is a diagram in which the positive peak values and radar reflection signal intensities of the negative peak shown in FIG. 7 are plotted against the distance between the ground surface and probe.

FIG. 8 shows a diagram in which the positive peak values and radar reflection signal intensities of the negative peak are plotted against the distance d between the ground surface 10 and probe 16. As can be seen from FIG. 8, the positive peak (indicated by +peak) and negative peak (indicated by −peak) have a high correlation with the distance. As shown in FIG. 8, it was found that according to the present invention, the positive and negative peak values in the earlier part of reflected signals, in particular, mainly include the reflected signals from the ground surface 10 and can be used effectively to compensate for the reflected signals from the ground surface 10.

If the distance between the probe 16 and ground surface 10 can be kept constant as is conventionally the case, the reflected signals from the ground surface 10 can be removed effectively by calculating differential signals between radar reflection signals, which are supposed to contain only the reflected signals from the ground surface 10, and the reflected signals from the ground surface 10.

However, the probe 16 according to the present invention is often held and manipulated by hand over the ground surface 10 during probing. Besides, the distance between the probe 16 and the ground surface 10 usually varies with the configuration and condition of the ground surface 10. In view of the above, it is assumed that the radar reflection signals containing the reflected signal from the search object 14 is superimposed with the reflected signal from the ground surface 10 at a distance which is given as the average of distances in a certain range. Thus, it is not appropriate to determine the background signal to be subtracted from the radar reflection signals by simply averaging all the signals. The subtle radar reflection signal from the buried search object 14 will be lost in the background signal, lowering the accuracy and sensitivity of probing.

Therefore, based on the fact that the practical distance d between the ground surface 10 and probe 16 is highly correlated with the peaks detected in radar reflection signals at a relatively early time, the present invention classifies radar reflection signals into groups using peak intensities directly without regard to the practical distance from the ground surface 10. Then, it calculates the standard background signal of each group as the average, median, maximum value, or minimum value of the radar reflection signals belonging to the given group. Then, it calculates differential signals between the standard background signal and the actual radar reflection signals separately for each group.

Figure 9:
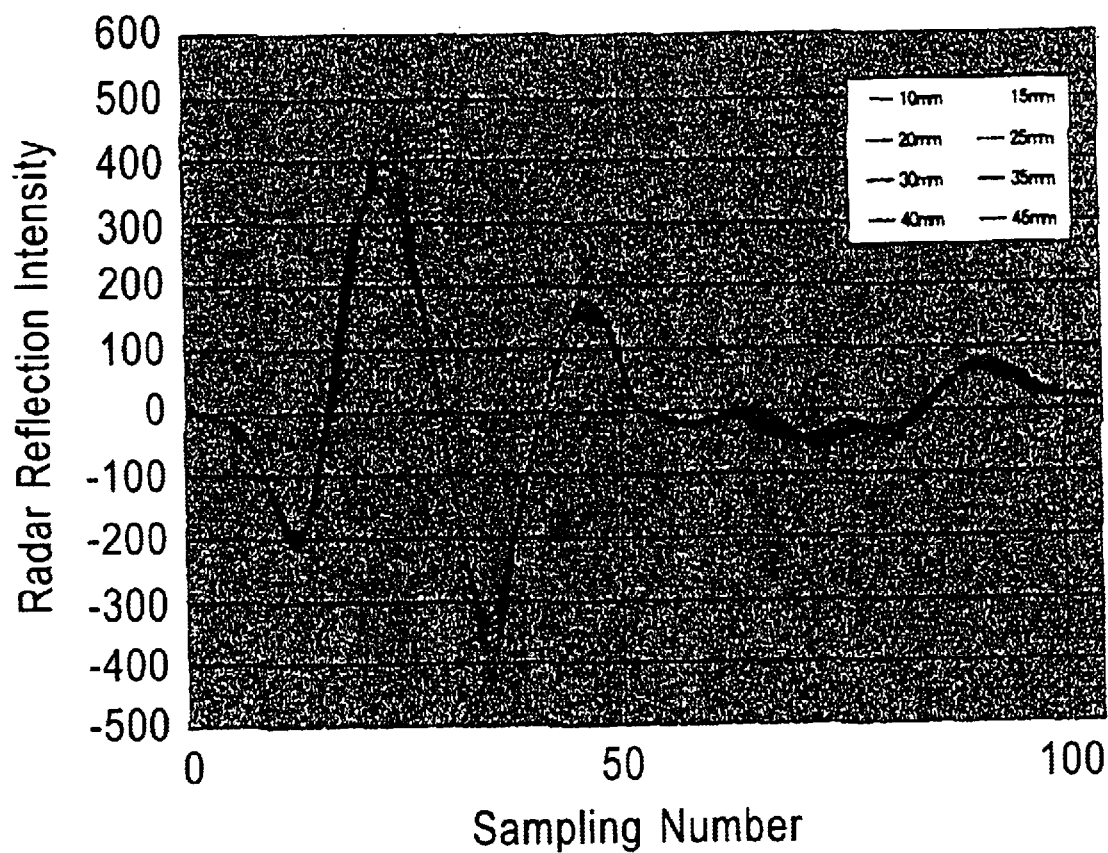
FIG. 9 is a diagram showing an embodiment in which radar reflection signals acquired by varying practical distance d are divided into groups.

FIG. 9 shows an embodiment in which radar reflection signals acquired by varying the practical distance d are divided into groups. The radar reflection signals a to h acquired by varying the practical distance d from 10 mm to 45 mm are assigned to group G1 for a distance of 10 to 15 mm, group G2 for a distance of 15 to 25 mm, group G3 for a distance of 25 to 35 mm, and group G4 for a distance of 35 to 45 mm, respectively. According to the present invention, the range of the distance d used for the grouping described above can be determined by detecting the maximum and minimum values of the largest positive peak of measured radar reflection signals and dividing the difference between the maximum and minimum values into, for example, n divisions. According to the present invention, it is also possible to form groups weighted according to such dependence between the peak intensity and practical distance d as shown in FIG. 8.

Thus, other than the one shown in FIG. 9, the number of groups can be decided as required, taking into consideration probing accuracy and work efficiency. Also, although each of the groups G1 to G4 in FIG. 9 contains two radar reflection signals (e.g., G1 contains a and b while G2 contains c and d), the present invention allows any number of radar reflection signals to be included in each group depending on probing accuracy and work efficiency.

FIG. 10 shows a data structure contained in the non-destructive probing system according to the present invention. It consists of radar reflection signals classified into peak intensity groups according to the present invention and corresponding standard background signals SB. Also, it can be seen that in the embodiment shown in FIG. 10, the standard background signals SB are given as the averages of the radar reflection signals contained in the respective groups.

Figure 11:
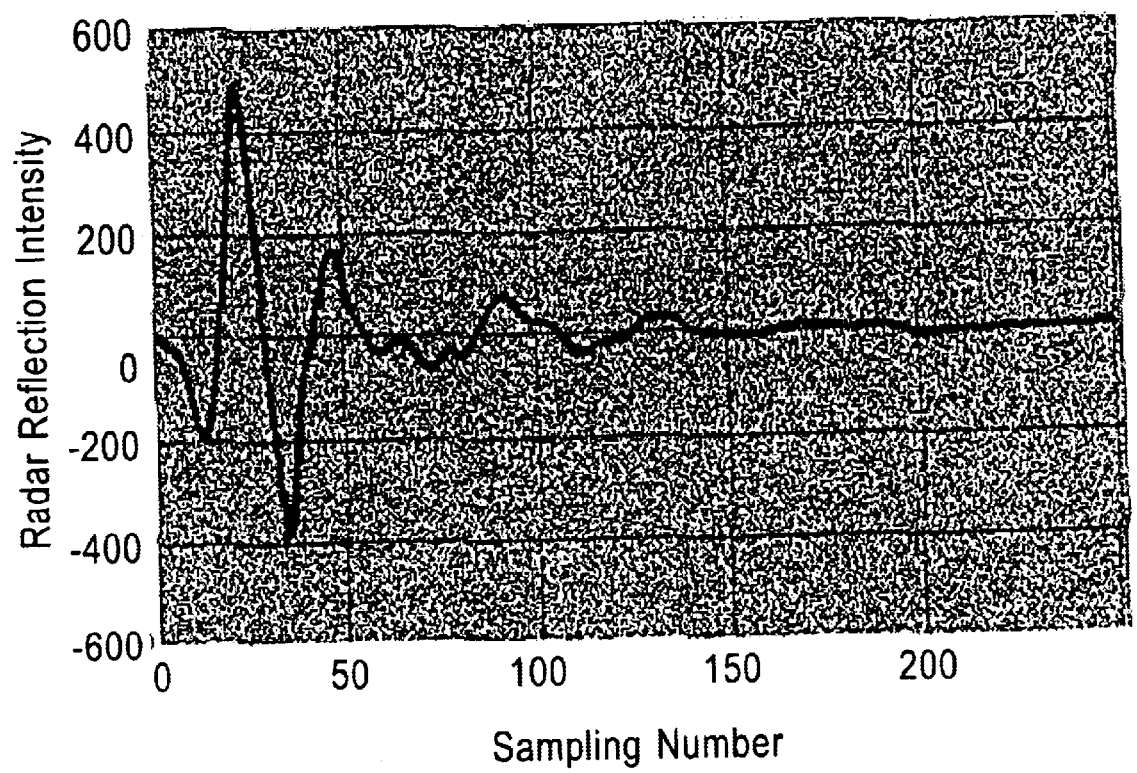
FIG. 11 is a diagram showing a single radar reflection signal after grouping.

FIG. 11 shows a single radar reflection signal contained in a group after groups are established for radar reflection signals. As shown in the figure, the reflected signal from the ground surface 10 constitutes a major structure in the radar reflection signal and is far larger than the signal from the search object 14 expected to be detected at subsequent sampling numbers. Thus, it can be seen that the signal from the search object 14 will be canceled out by variations in the practical distance d.

Figure 12:
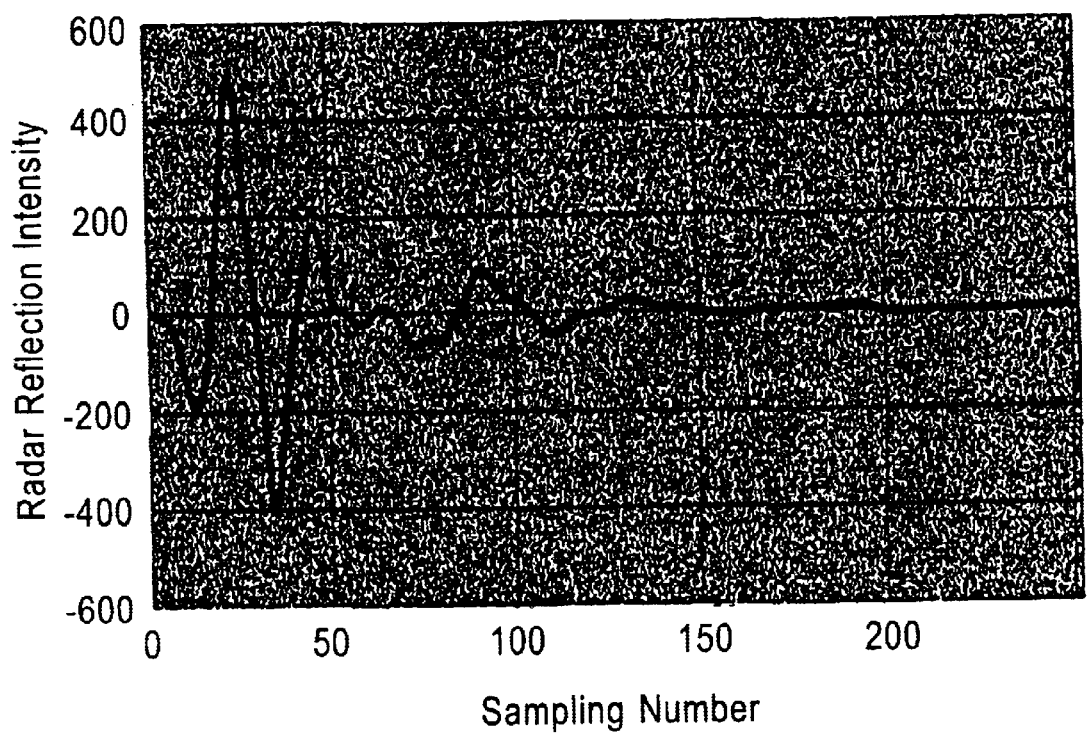
FIG. 12 is a diagram showing an embodiment of a standard background signal SB acquired by the non-destructive probing system of the present invention.

FIG. 12 shows an embodiment of a standard background signal SB acquired by the non-destructive probing system according to the present invention. In this embodiment, the standard background signal can be obtained, for example, by averaging the radar reflection signals classified into G1 shown in FIG. 9.

Figure 13:
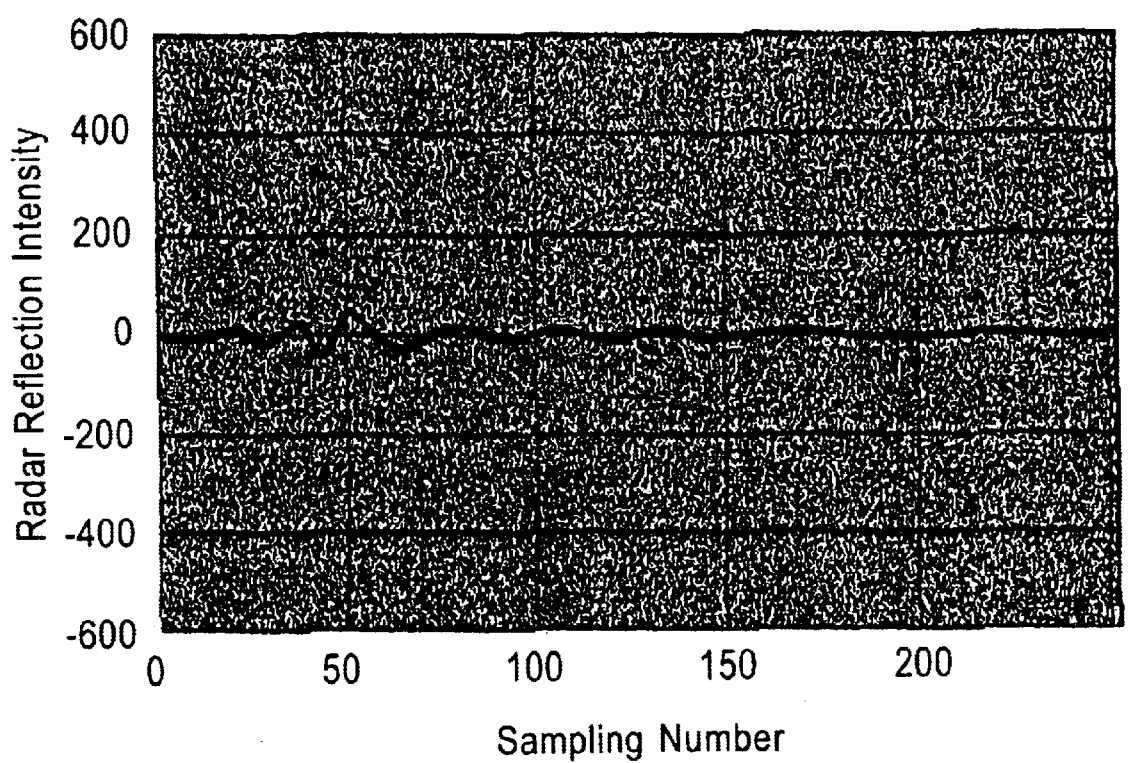
FIG. 13 is a diagram showing an embodiment of the differential signal, calculated according to the present invention, between the radar reflection signal shown in FIG. 11 and the standard background signal of the group to which the radar reflection signal is judged to belong.

FIG. 13 shows the differential signal, calculated according to the present invention, between the radar reflection signal shown in FIG. 11 and the standard background signal of the group to which the radar reflection signal is judged to belong. In FIG. 13, the large peaks which include the reflected signal from the ground surface 10 as shown in FIGS. 11 and 12 have disappeared, and the peak which represents the search object 14, i.e., the buried small anti-personnel mine, is clearly visible around the sampling number 50. As described above, the non-destructive probing system of the present invention enables high-sensitivity, high-accuracy probing even if the practical distance d between the ground surface 10 and probe 16 varies or if the distance cannot be determined uniquely and only practical values can be used.

A non-destructive probing method applied to the non-destructive probing system of the present invention will be described in more detail below.

Figure 14:
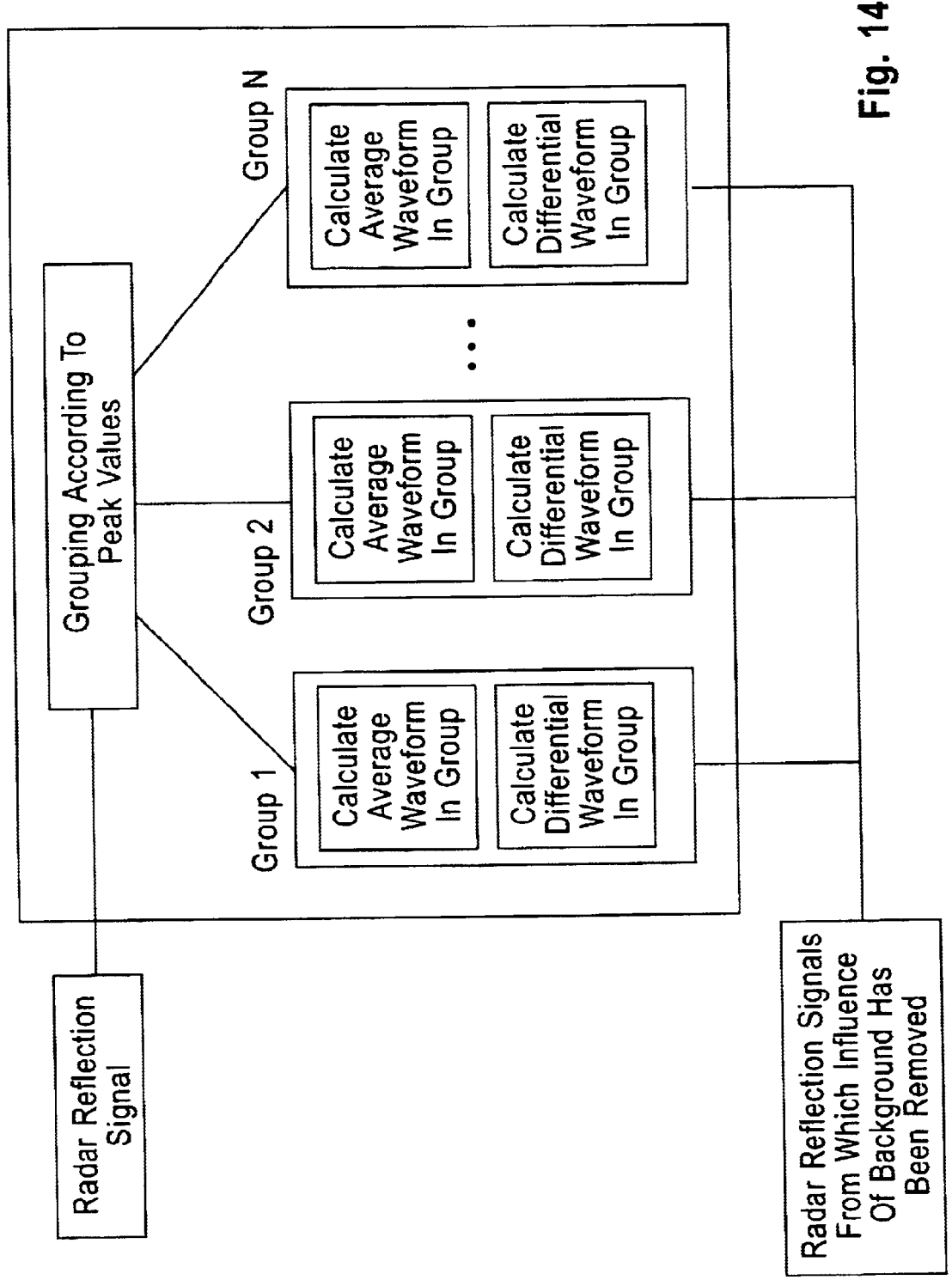
FIG. 14 is a schematic diagram showing a process according to the non-destructive probing method of the present invention.

FIG. 14 is a diagram showing the process according to the non-destructive probing method of the present invention schematically. As shown in the figure, the non-destructive probing method of the present invention divides measured radar reflection signals LR into groups Gl to Gn according to the values of the positive and negative peaks described above. Then, it calculates a standard background signal from the radar reflection signals LR of each group G1 (where i is a natural number equal to or larger than 2), generates differential signals between the radar reflection signals LR belonging to the group Gi and the standard background signal. In this way, the method removes background influence using an appropriate standard background signal for each group and then determines the location of the search object 14 using the resulting differential signals.

The radar reflection signals LR are acquired, for example, by dividing the field where the search objects 14 are expected to exist into designated probing grids and then taking a large number of measurements from each of the grids or meshes. For that, it is necessary to place the probe 16 manually with respect to each grid more than once. The distance d varies from measurement to measurement. The variation in the distance d is unavoidable especially if the ground surface 10 is bumpy or littered with stones. The non-destructive probing method according to the present invention can adequately handle the above-mentioned problems with real mine fields.

Figure 15:
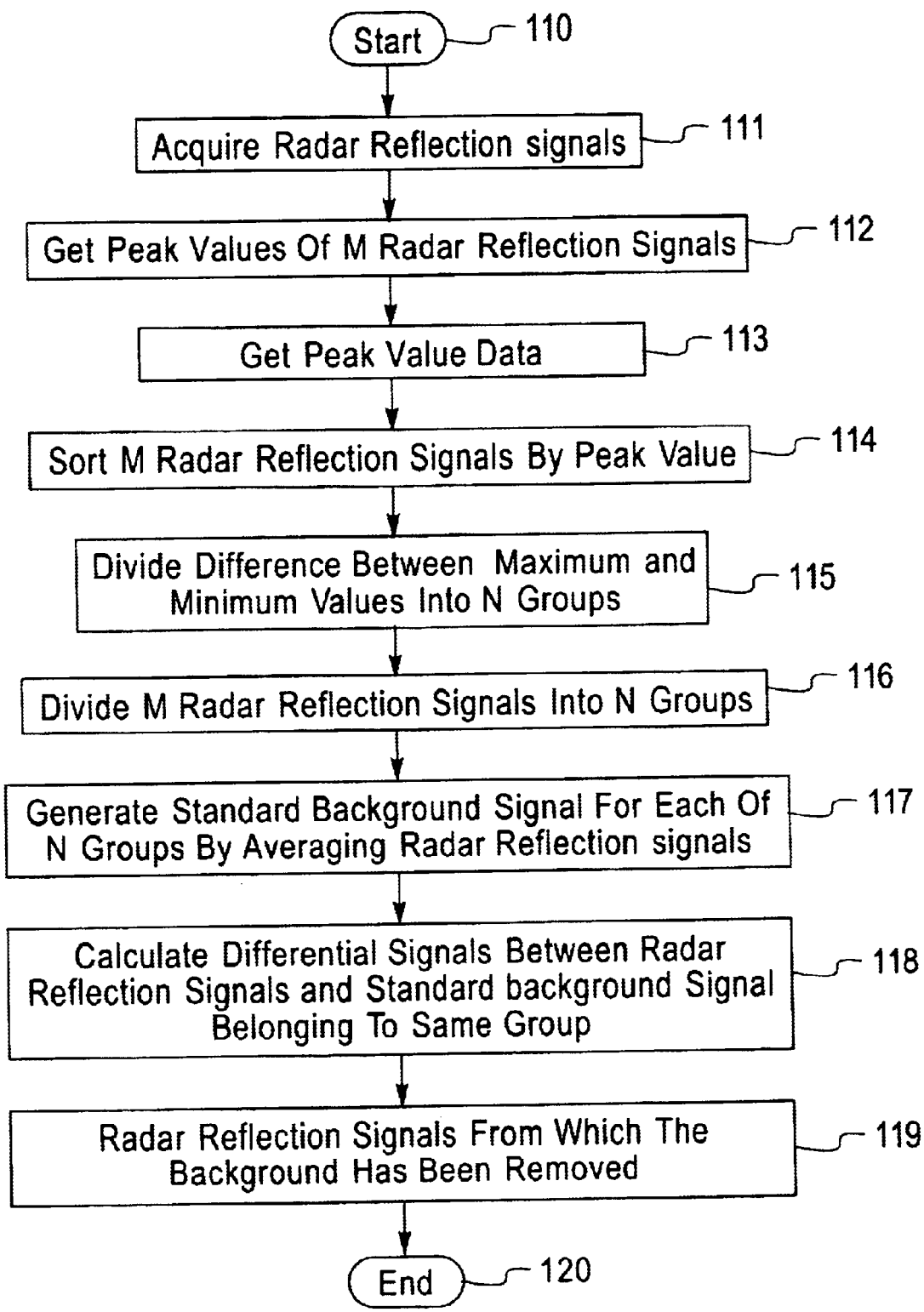
FIG. 15 is a flowchart showing the process of the non-destructive probing method according to the present invention in detail.

FIG. 15 is a flowchart showing the process of the non-destructive probing method according to the present invention in detail. The process shown in FIG. 15 starts with Step 110. Then in Step 111, the system acquires a total of m radar reflection signals from each grid or mesh formed in the probing field, using the reflection of the electromagnetic waves sent from the transmit antenna 18a of the probe 16.

In Step 112, the system obtains m pieces of peak value data each from the acquired positive peak value and negative peak value. Incidentally, the present invention allows grouping using only a positive or negative peak value. However, if positive and negative peak values are used relationally for multiple peaks, probing accuracy can be further improved by temporally isolating sudden noises such as noise spikes or power surges.

Next, in Step 114, the system determines the maximum and minimum peak values by sorting m radar reflection signals LR by peak value. In Step 115, the system forms n groups corresponding to the size of the peak values by dividing the difference between the maximum and minimum values into n divisions. The n divisions need not be equal in size. For example, if the practical distance d is small, which means that the peak value is affected greatly, the division can be set narrower.

Next, in Step 116, the system analyzes the radar reflection signals LR and assigns them to n groups of one or more radar reflection signals. In Step 117, the system generates a standard background signal SB for each of the n groups using the average, median, maximum value, or minimum value of the radar reflection signals LR classified into each group. In Step 118, the system calculates, for each group, differential signals (LR–S)i between the individual radar reflection signals LR contained in the group and the standard background signal SB. In Step 119, the system gets a total of m differential signals, i.e., radar reflection signals from which the background has been removed.

The reflection from the search object 14 is analyzed using the radar reflection signals from which the background signals have been removed as described above, and preferably, the existence of the search object is displayed graphically on the display means 42 by plotting the intensities of the reflection from the search object by grid or mesh, to indicate the existence of the search object to the operator.

Figure 16:
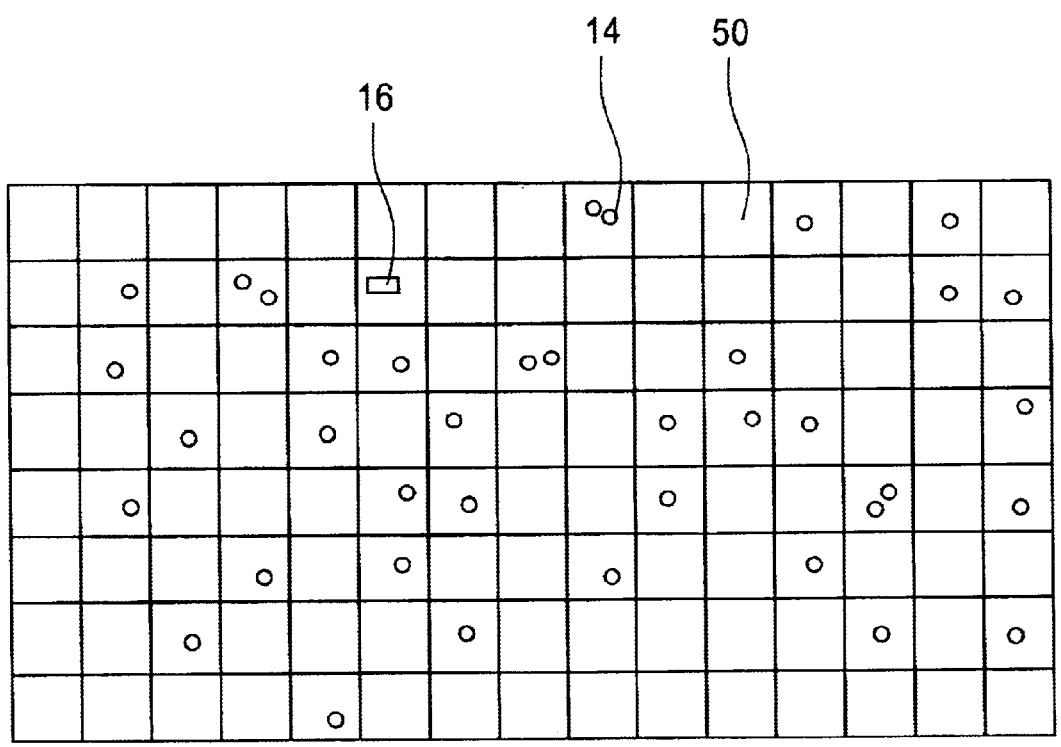
FIG. 16 is a plan view of a field divided into multiple grids or meshes at the time of applying the non-destructive probing method of the present invention to the field.

FIG. 16 is a plan view of a probing field to which the non-destructive probing method of the present invention is applied. As shown in the figure, the field where search objects 14 are buried is divided into multiple grids or meshes 50. The present invention acquires a plurality of radar reflection signals from each grid or mesh 50 by using the probe 16 and obtains grouped standard background signals. It calculates differential signals (LR–SB)i between the radar reflection signals RL thus acquired and the standard background signal SB calculated for each group. Then it calculates the location of the search object 14 from the differential signals and calculates the depth based on the range of reflection corresponding to the sampling numbers if possible.

Figure 17B:
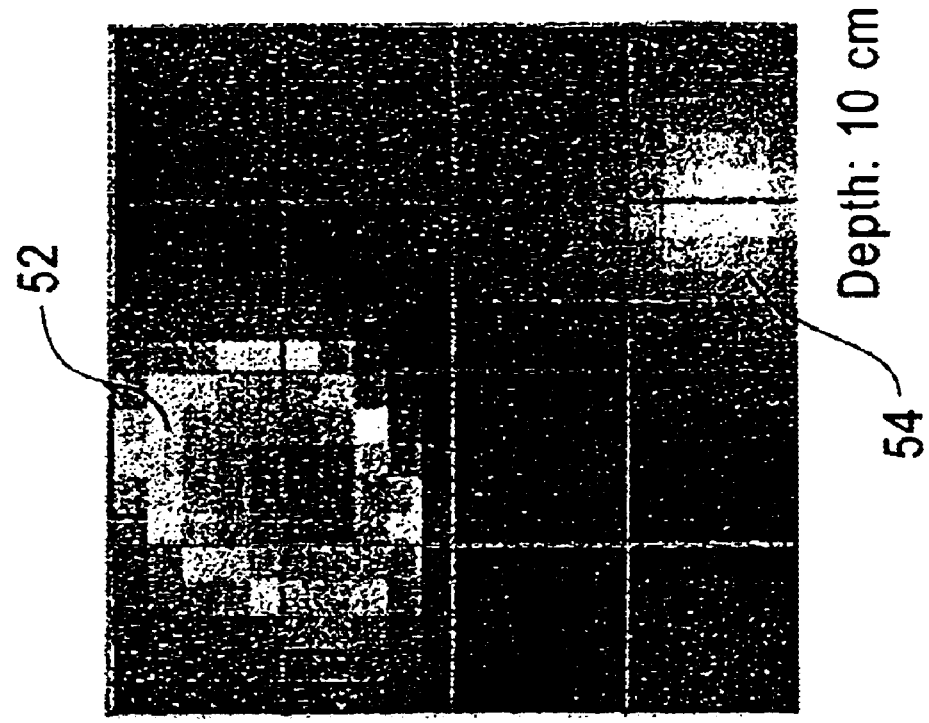
FIG. 17 shows an embodiment in which the non-destructive probing method of the present invention is applied to a small antipersonnel mine.
Figure 17A:
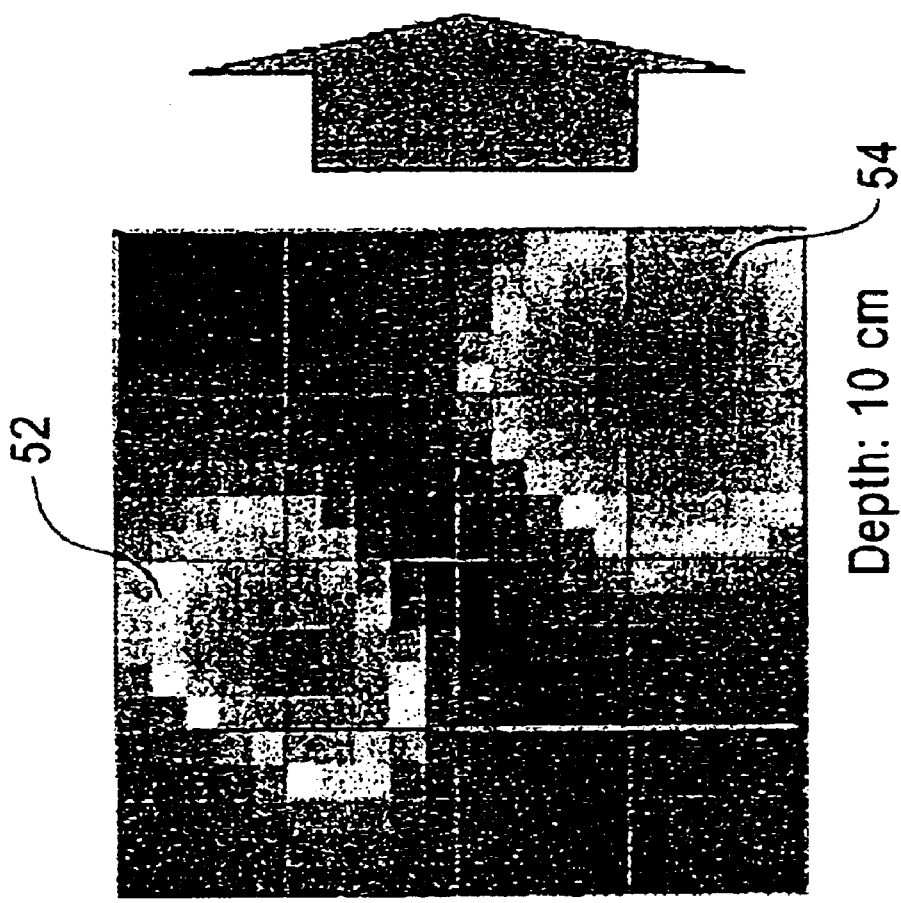

FIG. 17 shows an embodiment in which the non-destructive probing method of the present invention is applied to a small antipersonnel mine as the search object 14. FIG. 17A shows the results obtained by the conventional methods described with reference to FIG. 1 while FIG. 17B shows the results obtained by the present invention. In FIG. 17A, the two reflection areas 52 and 54 are observed as having almost equal intensities. However, in FIG. 17B, which shows the results obtained by the non-destructive probing method of the present invention, the reflection area 52 has an increased contrast while the reflection area 54 has a decreased contrast, indicating clearly that a search object is buried in the reflection area 52. Besides, it is judged that the reflection area 54 with its contrast reduced by the processing method of the present invention represents an object other than a search object.

Incidentally, although the distinction between the reflection areas 52 and 54 is not perfectly clear-cut even in FIG. 17B, the sensitivity and accuracy can be further improved by further optimizing conditions.

Figure 18:
FIG. 18 shows a buried mine found in a reflection area identified by the non-destructive probing method of the present invention shown in FIG. 17.

FIG. 18 shows the search object 14 actually dug out from the reflection area 54 identified by the non-destructive probing method of the present invention. As can be seen from FIGS. 17 and 18, the non-destructive probing method of the present invention removes background signals efficiently, making it possible to probe for search objects with high sensitivity and high accuracy.

The above-mentioned non-destructive probing method of the present invention can be implemented as a program run by the signal processing means of the present invention. Also, the program for executing the non-destructive probing method of the present invention can be written in any known programming language such as C or other object-oriented language by any known computing method.

Furthermore, the program for executing the non-destructive probing method of the present invention can be stored on any storage medium such as a floppy disk, hard disk, CR-ROM, optical magnetic disk, DVD, or magnetic tape. Then above-mentioned signal processing means 30 can be made to execute the non-destructive probing method of the present invention by reading the storage medium.

The present invention has been described by way of the specific embodiments shown in the drawings, but the present invention can have various embodiments other than those shown in the drawings. For example, although soil has been cited as an example of the matrix containing dielectric material, the present invention can be applied to search objects buried in any matrix such as concrete, mortar, or plastics in addition to soil. Also, besides small antipersonnel mines, search objects may be empty space, such as cavities, foreign matters, or cracks, produced by neutralization in metal, plastics, concrete, or mortar; or foreign matters or voids in plastics. The present invention will make great industrial contributions.

What is claimed is:

1. A non-destructive probing system for non-destructively probing for a search object buried in a matrix containing dielectric material by radiating electromagnetic waves to said matrix, comprising:

a probe which is disposed in opposing relation to a surface of said matrix, radiates electromagnetic waves to said matrix, and detects radar reflection signals formed by reflection of said electromagnetic waves; and a signal processor for calculating the signal reflected by the search object from said radar reflection signals, wherein said signal processor comprises:

a unit for forming designated groups from said radar reflection signals;

a storage for storing said designated groups of radar reflection signals individually, a first calculator for calculating a standard background signal from each of said designated groups of radar reflection signals stored individually, a second calculator for calculating a differential signal between each of said radar reflection signals and said standard background signal separately for each of said designated groups, and a unit for identifying the signal reflected from said search object out of said differential signal.

2. The non-destructive probing system according to claim 1, wherein the designated groups of radar reflection signals are formed in accordance with the distance between said probe and said matrix surface.

3. The non-destructive probing system according to claim 1, wherein the designated groups of radar reflection signals are formed using peak intensities of said radar reflection signals.

4. The non-destructive probing system according to claim 1, wherein said standard background signal is generated as the average, median, maximum value, or minimum value of the radar reflection signals classified into the same group among said designated groups.

5. The non-destructive probing system according to claim 1, wherein said matrix is soil.

6. The non-destructive probing system according to claim 1, wherein said electromagnetic waves have a frequency of 10 GHz or less.

7. A method for non-destructively probing for a search object buried in a matrix containing dielectric material by disposing a probe with respect to said matrix and radiating electromagnetic waves from said probe to said matrix, comprising the steps of:

disposing an antenna in opposing relation to a surface of said matrix;

radiating electromagnetic waves from said probe to said matrix and detecting radar reflection signals;

forming designated groups from said radar reflection signals;

storing said radar reflection signals by dividing them into said designated groups;

determining a standard background signal for each of said designated groups;

calculating a differential signal between each of said radar reflection signals belonging to said selected group and said standard background signal; and extracting the signal reflected by said buried search object from said differential signal.

8. The non-destructive probing method according to claim 7, further comprising a step of forming the designated groups of radar reflection signals in accordance with the distance between said probe and said matrix surface.

9. The non-destructive probing method according to claim 7, further comprising a step of forming the designated groups of radar reflection signals using peak intensities of said radar reflection signals.

10. The non-destructive probing method according to claim 7, further comprising a step of calculating said standard background signal as the average value of the radar reflection signals classified into the same group among said designated groups.

11. The non-destructive probing method according to claim 7, further comprising a step of providing said matrix as a soil.

12. The non-destructive probing method according to claim 7, further comprising a step of providing said electromagnetic waves having a frequency of 10 GHz or less.

13. The non-destructive probing method according to claim 7, further comprising a step of calculating said standard background signal as the median value of the radar reflection signals classified into the same group among said designated groups.

14. The non-destructive probing method according to claim 7, further comprising a step of calculating said standard background signal as the maximum value of the radar reflection signals classified into the same group among said designated groups.

15. The non-destructive probing method according to claim 7, further comprising a step of calculating said standard background signal as the minimum value of the radar reflection signals classified into the same group among said designated groups.

16. A computer-readable storage medium that records a program for executing a non-destructive probing method comprising a step of disposing a probe in opposing relation to a surface of a matrix which contains dielectric material, a step of radiating electromagnetic waves from said probe to the matrix and detecting radar reflection signals, and a step of processing radar reflection signals which contain reflection from a search object by using a signal processor, wherein said storage medium makes said signal processor execute the steps of:

forming designated groups from said radar reflection signals;

storing said radar reflection signals by dividing them into said designated groups;

determining a standard background signal for each of said designated groups;

calculating a differential signal between each of said radar reflection signals belonging to said selected group and said standard background signal; and extracting the signal reflected by said buried search object from said differential signal.

17. The computer-readable storage medium according to claim 16, which causes the execution of a step of forming the designated groups of radar reflection signals in accordance with the distance between said probe and said matrix surface using peak intensities of said radar reflection signals.

18. The computer-readable storage medium according to claim 16, which causes the execution of a step of calculating said standard background signal as the average value of the radar reflection signals classified into the same group among said designated groups.

19. The computer-readable storage medium according to claim 16, which causes the execution of a step of calculating said standard background signal as the median value of the radar reflection signals classified into the same group among said designated groups.

20. The computer-readable storage medium according to claim 16, which causes the execution of a step of calculating said standard background signal as the maximum value of the radar reflection signals classified into the same group among said designated groups.

21. The computer-readable storage medium according to claim 16, which causes the execution of a step of calculating said standard background signal as the minimum value of the radar reflection signals classified into the same group among said designated groups.

* * * * *